N. W. PERKINS, Jr.
HANDLE MECHANISM.
APPLICATION FILED OCT. 24, 1910. RENEWED JULY 7, 1911.
1,016,287.
Patented Feb. 6, 1912.
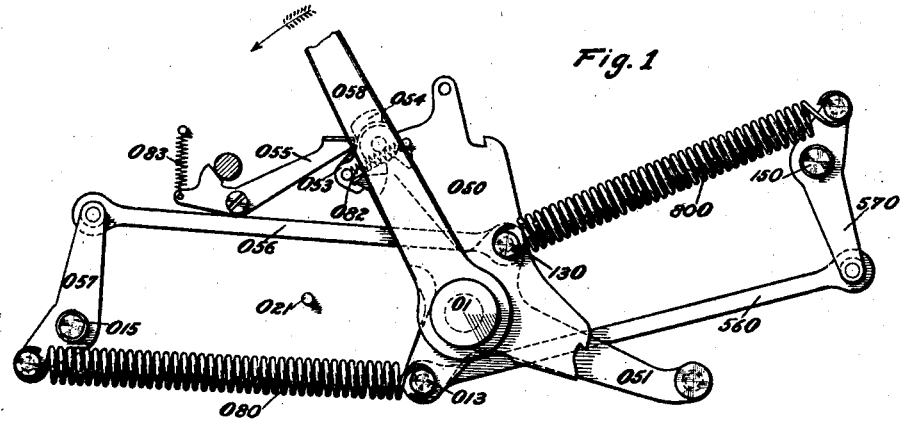
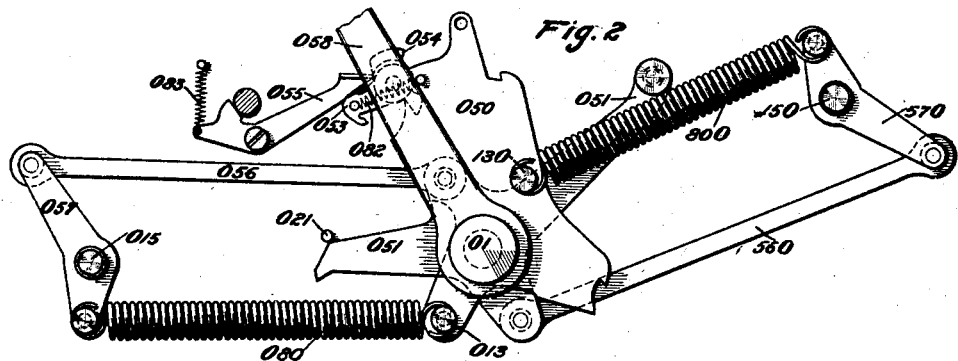
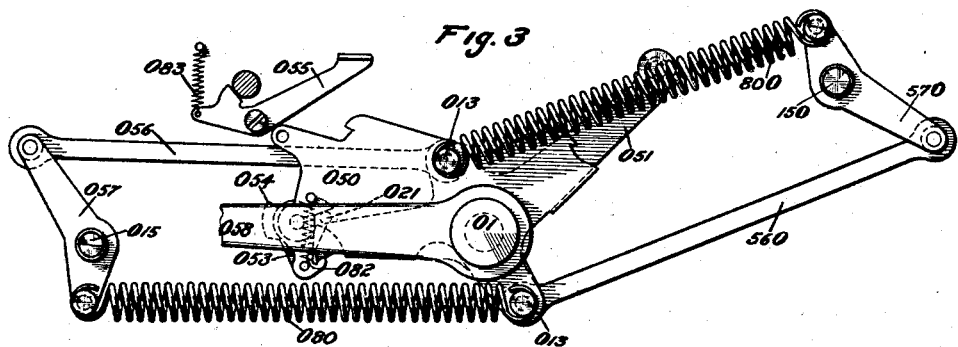

UNITED STATES PATENT OFFICE.

NATHAN W. PERKINS, JR., OF EAST ORANGE, NEW JERSEY.

HANDLE MECHANISM.

1,016,287.      Specification of Letters Patent.      Patented Feb. 6, 1912.

Application filed October 24, 1910, Serial No. 588,769. Renewed July 7, 1911. Serial No. 637,325.

*To all whom it may concern:*

Be it known that I, NATHAN W. PERKINS, Jr., a citizen of the United States, residing at East Orange, county of Essex, and State of New Jersey, have invented certain new and useful Improvements in Handle Mechanism, of which the following is a specification.

This device belongs to that class of mechanism for operating adding-machines and cash registers, calculating machines, etc., in which the handle is moved slightly in its operating direction, permitting the mechanism to complete its forward cycle by unlocking the same. This movement of the mechanism is to be regulated by some suitable governor so that if the handle moves slower than the governor is set to permit the mechanism to work the moving parts will go faster than the handle. On the other hand, if the handle travels faster than the governor is set, then the handle will leave the mechanism behind and the same will follow until the forward cycle is complete. In this invention, the same set of springs serves to operate the driven member, and also to return the handle and the driven member to their normal positions.

Referring to the drawings, Figure 1 is a side view of the mechanism in its normal position of rest. Fig. 2 is a similar view of the mechanism after the handle has moved far enough forward to unlock the driven members. Fig. 3 is a similar view showing the handle in its extreme forward position ready to return to its normal position, as shown in Fig. 1.

In these views, similar letters of reference refer to similar parts in all cases.

Referring to the drawings, O 1, is the end of a shaft which is in this case the driven member. A piece O 51 is provided with a lip at its extreme left-hand end, as shown in Fig. 2. This piece O 51, is secured to the shaft O 1, and turns with it. As shown in the accompanying drawings the amount of rotation is about 60°. Loosely mounted on the shaft O 1, is a handle O 58, which serves as a source of power. Secured to the handle O 58, and moving with it, is an irregular plate O 50, upon the upper end of which is pivotally mounted a hook O 53. This hook O 53, engages the lip on the end of the piece O 51, secured to the shaft O 1, and is held normally in engagement by the small spring O 82. Mounted extraneously to the shaft O 1, on suitable pivots O 15, and 15 O, are two bent levers O 57, and 57 O, the upper arm of O 57, being longer than its lower arm, and the lower arm of 57 O, being longer than its upper arm. A coil spring O 80, extends and is connected between a stud O 13, mounted in the piece O 50, and the lower end of the lever O 57. A similar spring 80 O, is connected at one end to a stud 13 O, in the piece O 50, and extends and is connected to the upper end of the lever 57 O. Connected to the upper end of the lever O 57, is a link O 56, the other end of which is connected to the piece O 51. A similar link 56 O, connects the lower end of the lever 57 O, to the piece O 51, which connections are all clearly shown in the three views Figs. 1, 2 and 3. A small lever O 55, is pivoted in a suitable position to engage a projecting wing O 54, of the hook O 53 and is held in its normal position by a spring O 83.

The operation of this device is as follows: The normal position of the parts at rest being indicated in Fig. 1, and any suitable means being provided to prevent further rotation of the parts to the right, the handle O 58, is moved in the direction of the small arrow shown in Fig. 1. This causes the wing O 54 of the hook O 53 to engage with the upper end of the lever O 55 which offers a resistance to the forward movement of the hook O 53 and causes O 53 to disengage itself from the lip of O 51. O 51 on the shaft O 1 being released immediately moves to the position indicated in Fig. 2 which is the other extreme end of their travel, any suitable stays being provided and the same not being shown in the drawings. The cause of this movement is the contraction of the springs O 80 and 80 O. The studs O 13 and 13 O being secure to the piece O 50 which moves with the handle O 58, remaining comparatively stationary, the springs O 80 and 80 O pull on the levers O 57 and 57 O and through the links O 56 and 56 O rotate the piece O 51. The result of the move is clearly shown in Fig. 2. The handle O 58 being now drawn forward to its extreme position as indicated in Fig. 3, the hook O 53 will come forward with it until a small wing similar to O 54 engages the pin O 21, which causes the hook O 53 to swing backward under the influence of the spring O 82 and reëngage the lip on the end of the piece O 51. When the handle O 58 is in the position shown in Fig. 3, the springs O 80 and 80 O are extended to their maximum length. This tension on the springs O 80 and 80 O causes the mechanism to be in a state of unstable equilibrium and on releasing the handle O 58 the springs O 80, and 80 O, will partially contract and cause the parts to assume positions indicated in Fig. 1, in which position the operation is all ready to be repeated.

This invention is especially applicable to the operating of adding and listing machines in which class of device it is essential that the handle be permitted to operate either faster or slower than the operating shaft of the machine, thereby preventing the operator from injuring the machine by the speed with which he pulls the handle. The same mechanism may also be used on all kinds of handle-operated machines wherein it is desirable that the machine-driving member should be flexibly connected to the operating handle. It is not my desire to be confined to the exact form of parts shown in the drawings as these may be modified in any suitable way to fit the particular requirements of any individual case in which the mechanism can be employed.

Having thus described my invention, what I claim as new and desire to secure by Letters Patent, is:—

1. In a snap operating mechanism, the combination with a movable member, of an actuable operating device movable in relation thereto, latching means for holding the aforesaid movable member in normal position adapted to be tripped on the movement of the actuable operating device, and spring means interposed between the operating device and movable member which is adapted to be tensioned by the movement of the operating device and acts to restore the movable member and operating device to normal position.

2. In a snap operating mechanism, the combination with a movable member, of an actuable operating device movable in relation thereto, latching means for holding the aforesaid movable member in normal position adapted to be tripped on the movement of the actuable operating device, pivoted levers, links connecting said levers to the movable member aforesaid, and springs connecting the levers to the operating device, whereby the springs are tensioned by the movement of the operating device.

3. In a snap operating mechanism, the combination with a movable member, of an actuable operating device movable in relation thereto, latching means for holding the aforesaid movable member in normal position adapted to be tripped on the movement of the actuable operating device, pivoted levers each having a long and a short arm, links connecting the long arms of said levers to the movable member, and springs connecting the short arms of said levers to said operating device, whereby the springs are tensioned by the movement of the operating device.

4. In a snap operating mechanism, the combination with a pivoted power transmitting member, of a pivoted handle movable in relation thereto, latching means for holding the said member in normal position adapted to be tripped on the movement of the handle, and a spring operating device operatively connected to the handle and to the power transmitting member on opposite sides of the pivot thereof which is adapted to be tensioned by the movement of the operating device.

5. In a snap operating mechanism, the combination with a pivoted power transmitting member, of a pivoted handle movable in relation thereto, latching means for holding the said member in normal position adapted to be tripped on the movement of the handle, pivoted levers, springs connecting said levers to the handle on opposite sides of the fulcrum thereof, and links connecting the levers to the power transmitting member on opposite sides of its fulcrum, said springs being adapted to be tensioned by the movement of the operating device.

6. In a snap operating mechanism, the combination with a movable member, of an actuable operating device movable in relation thereto, latching means for holding the aforesaid movable member in normal position adapted to be tripped on the movement of the actuable operating device, spring means interposed between the operating device and movable member which is adapted to be tensioned by the movement of the operating device, and means for causing the latching means to re-lock the movable member and operating device together so that they will be returned together to normal position by the reaction of the spring means aforesaid.

7. In a snap operating mechanism, the combination with a pivoted member, of a pivoted actuable operating device movable in relation thereto, latching means for holding the aforesaid movable member in normal position adapted to be tripped on the movement of the actuable operating device, a spring operating device operatively connected to the operating device and to the movable member aforesaid on opposite sides of the pivot thereof which is adapted to be tensioned by the movement of the operating device, and means for causing the latching means to re-lock the movable member and operating device together so that they will be returned together to normal position by the reaction of the spring operating means aforesaid.

8. In a snap operating mechanism, the combination with a pivoted member, of a pivoted actuating handle movable in relation thereto, a latch carried by one of said parts for engagement with the other of said parts to hold the pivoted member in normal position adapted to be tripped on the movement of the operating handle, spring means interposed between the operating handle and the pivoted member aforesaid which is adapted to be tensioned by the movement of the handle, and means for automatically relocking the handle and member together after the handle has performed its advance stroke so that the handle and member will be automatically returned together to normal position by the reaction of the spring means aforesaid.

In testimony whereof, I hereunto affix my signature in presence of two witnesses.

NATHAN W. PERKINS, Jr.

Witnesses:
HALCOLM ELLIS,
WALTER J. BURCHETT.